United States Patent
Kundinger et al.

(10) Patent No.: US 6,969,246 B1
(45) Date of Patent: Nov. 29, 2005

(54) FORMING STATION AND PROCESS FOR TWIN SHEET THERMOFORMING

(75) Inventors: James Kundinger, Auburn, MI (US); Stephen Keeley, Claire, MI (US)

(73) Assignee: Brown Machine, LLC, Beaverton, MI (US)

( * ) Notice: Subject to any disclaimer, the term of this patent is extended or adjusted under 35 U.S.C. 154(b) by 350 days.

(21) Appl. No.: 10/218,982

(22) Filed: Aug. 14, 2002

Related U.S. Application Data

(60) Provisional application No. 60/398,266, filed on Jul. 24, 2002.

(51) Int. Cl.$^7$ .............................................. B29C 69/02
(52) U.S. Cl. ...................... 425/515; 264/545; 425/503; 425/519; 425/521
(58) Field of Search ................................. 425/503, 504, 425/515, 519, 521; 264/545

(56) References Cited

U.S. PATENT DOCUMENTS

| | | | |
|---|---|---|---|
| 3,669,594 A | 6/1972 | Brown et al. ............... | 425/397 |
| 3,779,687 A | 12/1973 | Alesi .......................... | 425/388 |
| 3,854,860 A | 12/1974 | Haag .......................... | 425/504 |
| 3,868,209 A | 2/1975 | Howell ........................ | 425/504 |
| 5,427,732 A | 6/1995 | Shuert ........................ | 425/388 |
| 5,759,591 A | 6/1998 | Rhoades et al. ......... | 425/387.1 |
| 5,800,846 A | 9/1998 | Hart ............................ | 425/504 |
| 5,814,185 A | 9/1998 | Chun et al. ................. | 425/394 |
| 5,885,691 A | 3/1999 | Breezer et al. ............. | 425/504 |
| 6,187,252 B1 | 2/2001 | Rhoades et al. ............ | 425/504 |
| 6,200,122 B1 * | 3/2001 | Chun et al. ................. | 425/136 |
| 6,372,176 B1 | 4/2002 | Ekendahl et al. ........... | 425/388 |
| 6,386,856 B1 | 5/2002 | Chern et al. ................ | 425/501 |
| 6,705,853 B1 * | 3/2004 | Nehring ....................... | 425/504 |
| 2002/0017745 A1 | 2/2002 | Vorenkamp et al. ........ | 425/503 |

* cited by examiner

*Primary Examiner*—Robert B. Davis
(74) *Attorney, Agent, or Firm*—John R. Benefiel

(57) ABSTRACT

A forming station for a thermoformer in which the lower platen is lowered and moved laterally on linear bearings on the machine frame after two sheets are formed in side by side mold-plug assist tool sets so as to align the respective molds and formed sheets. The formed sheets are squeezed together with flanges on the formed sheets thereby fused together by a draw mechanism including a series of hydraulic cylinders which are connected to coupled elements carried by the upper and lower platens so as create the squeezing movement when the cylinders are pressurized. A precision control is exercised over the operation of each of the cylinders using a position sensing device associated with each cylinder to insure equal movement of the output member of each cylinder. The lower platen vertical drive is activated in correspondence with the travel produced by the hydraulic cylinders to reduce the load on a brake holding the upper platen stationary.

11 Claims, 9 Drawing Sheets

FORMING STATION AND PROCESS FOR TWIN SHEET THERMOFORMING

CROSS REFERENCE TO RELATED APPLICATION

This application claims the benefit of the U.S. provisional patent application Ser. No. 60/398,266, filed Jul. 24, 2002.

BACKGROUND OF THE INVENTION

This invention concerns thermoforming forming stations and processes. Thermoforming is a process of forming preheated plastic sheet material by using differential fluid pressures to conform the sheet material to mold surfaces. Twin sheet thermoforming involves the thermoforming of two sheets which are then fused together to form a completed part. This has been done in manufacturing automotive fuel tanks for example, in which the top and bottom tank halves are formed from separate sheets which are then fused together along abutting flanges on each sheet. This process has particular advantages when used for manufacturing fuel tanks as described in U.S. published patent application 2002/0017745 A1.

Various apparatus and processes have been devised for carrying out such twin sheet thermoforming.

Copending application U.S. Ser. No. 10/036,316, filed on Dec. 26, 2001 describes a forming station for twin sheet thermoforming involving simultaneous forming of two sheets and subsequent fusing of the two formed sheets in a single forming station to produce a hollow part. Mold and plug assist tools on one platen are shifted simultaneously with respect to tooling on the other platen in order to align the molds containing two formed sheets in preparation for fusing flanges on the sheets by pressing the same together.

This arrangement is an improvement over an apparatus shown in U.S. Pat. No. 6,372,176 which shows transfer of tooling between separate forming stations since two separate forming presses are required. Another arrangement is shown in U.S. Pat. No. 5,658,523 which uses independent actuators for the plug assist and mold, with the plug assist moved away from the platen when the molds are aligned. In this case, a separate actuator for vertical motion of the plug assist is also required.

U.S. Pat. No. 5,814,185 assigned to the same assignee as the present application describes an improved arrangement for carrying out precision uniform fusing of two thermoformed sheets using hydraulic cylinders and adjustable locking shafts able to be coupled together at various relative positions of the platens.

If the plug assist and mold tools are mounted together for lateral movement on the platen by linear bearings, the high fusing pressure could damage these bearings, which already must bear the heavy weight of the tools, when the hydraulic cylinders are activated to fuse the sheets together.

This results since the hydraulic pressure acts to draw the platens together, which pressure is felt by the bearings supporting the tool set shiftable on the platen. Also, shifting of the tools on the platen requires a much larger platen, increasing its cost and mass which necessitates larger bearings, motors, etc.

The aforementioned copending application also describes shifting of the upper plug assist and mold tools. The upper mold retains one of the formed sheets, and the lateral shifting movement of the mold results in an increased possibility of the formed sheet dropping out of the mold during this shifting movement.

It is the object of the present invention to provide a forming station and process for twin sheet thermoforming which minimizes the number of actuators necessary to carry out the process. It is a further object to provide an improved forming station in which the bearings supporting movable tools are not loaded by the fusing pressure.

It is still another object to make such a twin sheet thermoforming process more trouble free.

SUMMARY OF THE INVENTION

The above recited objects as well as others which will become apparent upon a reading of the following specification and claims are accomplished by mounting the lower platen to be movable on the machine frame, to enable shifting of a lower mold and plug assist tool set to be offset with respect to an upper mold and plug assist tool set to align the upper mold and lower mold to enable fusing together of thermoformed sheets previously formed in the respective molds.

The upper and lower platens are each driven vertically to carry out sheet forming by a servo motor driving pinion gears, each engaging a gear rack on a respective one of a set of gear rack posts arranged about each platen. The molds and retained formed sheets are moved into alignment after the two sheets have been formed by respective aligned mold and plug assist tools.

One of the platens, preferably the lower platen, is mounted on linear bearings and advanced and retracted thereon by pinion gears engaging respective fixed gear racks extending alongside each side of the lower platen, a motor provided to drive the pinion gears. This enables horizontal shifting of the lower platen and mold and plug assist carried thereon to bring the respective molds into alignment.

After the molds are aligned by shifting of the lower platen, and the flanges of the formed sheets aligned, the lower platen is drawn up to the upper platen, being held in position by brake devices, to fuse the flanges on the formed sheets together by a series of end to end aligned and selectively coupled elements secured to the upper and lower platens respectively. Activation of a series of hydraulic cylinders in the general manner described in U.S. Pat. No. 5,814,185 acting through the coupled elements draws the lower platen upwardly to squeeze the abutting flanges on the formed sheets. This same pressure fuses the formed sheets together in a manner which does not load the linear bearings supporting the lower platen for horizontal shifting movement.

Thus, only a single press and forming station is required to form both sheets simultaneously and to subsequently fuse the two formed sheets together to complete the part. This minimizes the number of actuators required and reduces the complexity and cost of the apparatus. In addition, by not mounting the mold and plug assist for shifting movement on one of the platens, the size and weight of that platen is reduced over that which would be required if this shifting movement was carried out on the platen.

An improvement to the arrangement of the '185 patent referred to above is incorporated in that the hydraulic cylinders each have a linear transducer associated therewith to create electrical signals corresponding to the extent of movement of each of the cylinder rods.

These signals are used to control the flow of pressurized hydraulic fluid to each cylinder.

This enables a more precise control over the stroking of each cylinder rod to insure that uniform squeezing around the part flange occurs.

In addition, a load cell is mounted to each cylinder rod to generate signals indicating when all of the clearances in the elements and couplings have been eliminated and fusing compression has begun. The vertical platen drive is only then made to respond to signals from a linear transducer to drive the lower platen by its vertical drive to the position produced by the hydraulic cylinders. This unloads the weight of the lower platen from the upper platen brakes. This insures that flange compression is carried out by the hydraulic cylinder pressures and not attempted to be done by the platen drive.

DETAILED DESCRIPTION

Figure 1A:
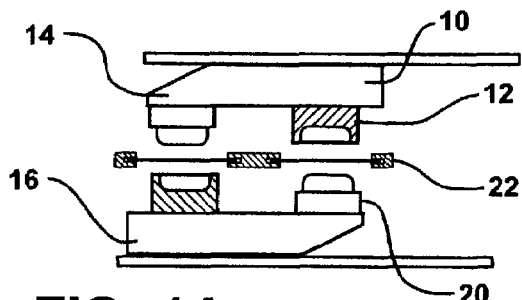
FIGS. 1A–1E are diagrammatic views of a forming station according to the present invention, depicting various stages of the forming process.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIGS. 1A–1E, the basic forming station states are diagrammatically represented. An upper platen 10 has a female mold 12 and male plug assist 14 mounted side by side on its undersurface.

A lower platen 16 has a female mold 18 mounted thereon aligned beneath the plug assist 14 and adjacent thereto a male plug assist 20 aligned beneath the upper mold 12.

As shown in FIG. 1A, a sheet feed system advances preheated "A" and "B" sheets each releasably clamped in a respective cavity in a clamping frame 22 into the space between the upper and lower tool sets, each sheet aligned with a respective mold-plug assist tool set. Such sheet feed systems are generally well known and may be designed for the requirements of the particular application.

In FIG. 1A, the upper and lower platen vertical drives 24, 26 cause the platens 10, 16 to be advanced to form the respective sheets with the tools by a conventional thermoforming process, using vacuum, and/or fluid pressure, etc. in the well known manner.

The lower platen 16 is thereafter retracted, the clamping frame 22 first releasing the now formed B sheet so that the formed B sheet remains in the mold 18 as the lower platen 16 is retracted.

Figure 1B:
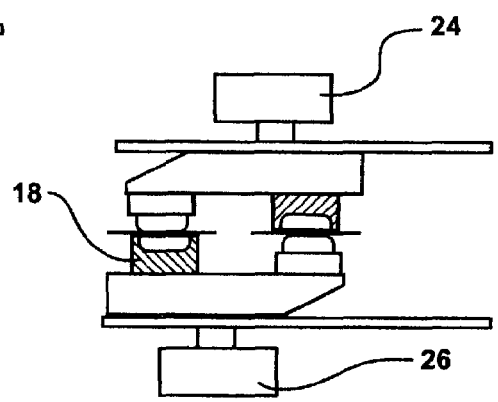
Figure 1C:
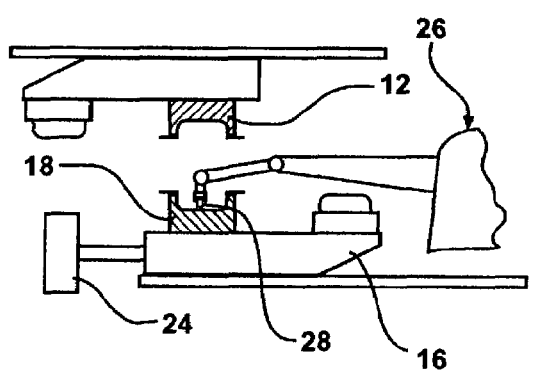

As indicated by FIG. 1C, the lower platen 16 is horizontally shiftable, and a horizontal drive 24 is activated to shift the lower platen 16 horizontally to a position whereat lower mold 18 is aligned beneath upper mold 12, each retaining their respective formed B and A sheets. A robot 26 or other loader device can emplace an insert 28 within the formed bottom or B sheet.

Figure 1D:
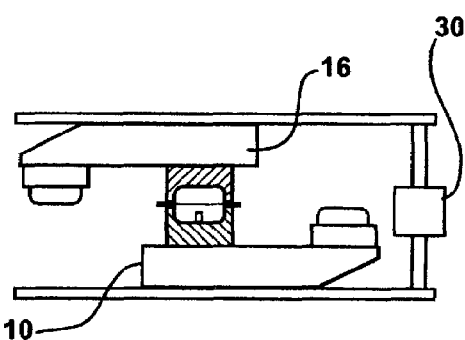

The upper and lower platens 10, 16 are drawn together by a hydraulic draw mechanism 30 as indicated in FIG. 1D to fuse the abutting flanges on the formed A and B sheets together. This mechanism 30 is generally similar to that described in U.S. Pat. No. 5,814,185 here incorporated by reference, with certain improvements described below. The upper platen 10 is held in position by brakes as described below and in the '185 patent, the lower platen 16 and upper platen 10 are coupled together by mechanical elements connected to hydraulic cylinders. The cylinders when pressurized draw the lower platen 16 up towards the stationary upper platen 10 as described below. A transducer senses this movement, and the servo motor drive is controlled so as to vertically move the lower platen 16 so as to follow this squeezing movement to support the weight of the lower platen 16, to avoid overloading the brake holding the upper platen 10, as described below in further detail.

Figure 1E:
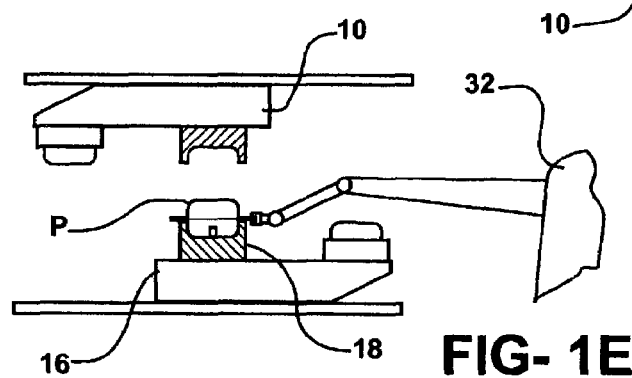

The clamping frame 22 releases the upper A sheet, so that when the lower platen 16 is again lowered, as indicated in FIG. 1E the completed part P will be in the lower mold to be accessible by an unloader 32 to be removed.

Figure 2:
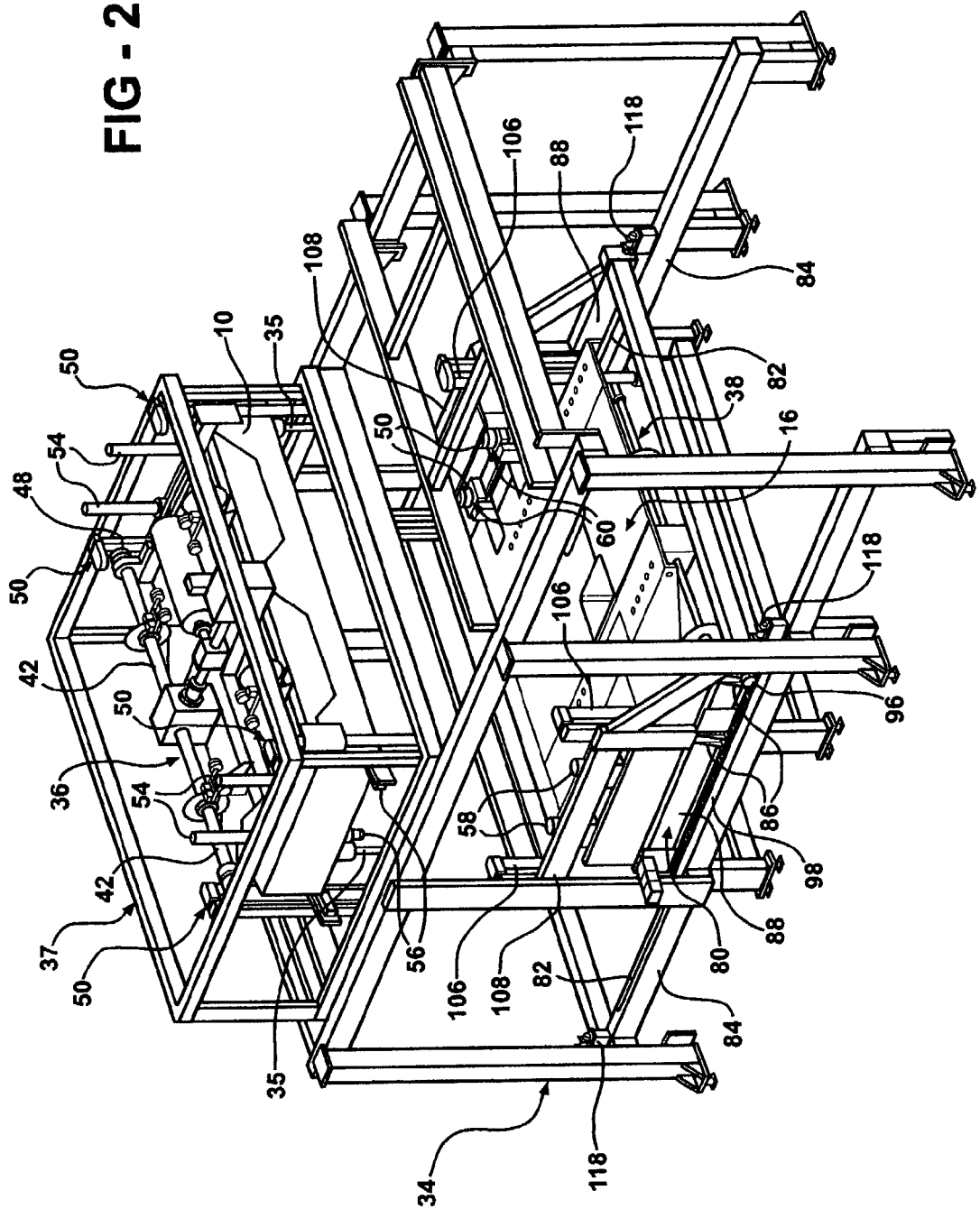
FIG. 2 is a perspective view of the main components of the forming station according to the invention shown in FIG. 1.

FIG. 2 shows the basic components of the forming station according to the invention, various conventional details and components not shown in the interests of clarity.

A machine frame 34 supports an upper platen assembly 36 including the upper platen 10 suspended over a lower platen assembly 38 including the lower platen 16.

Both the upper platen 10 and lower platen 16 are mounted for vertical motion as described above by respective vertical drive systems.

Figure 7:
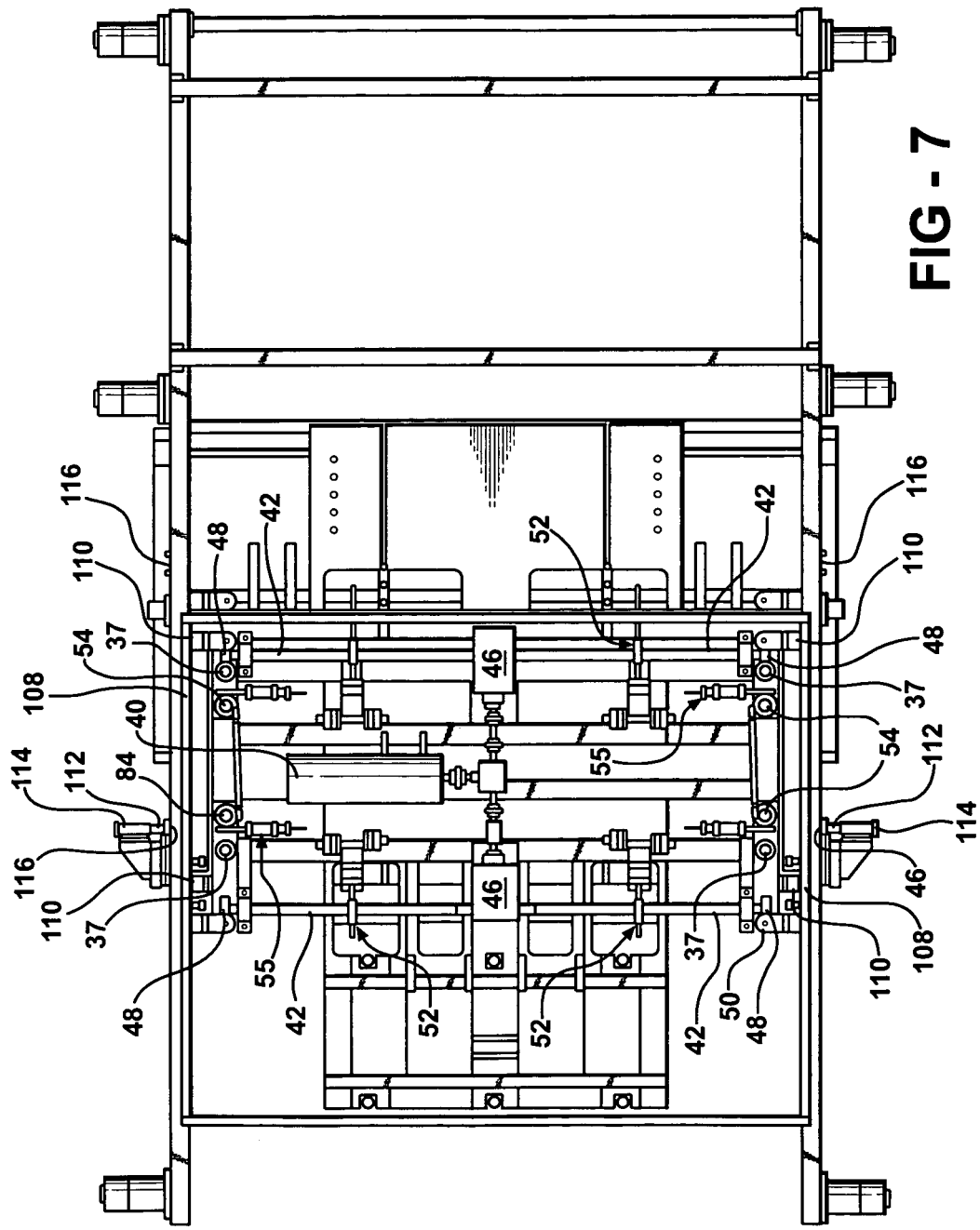
FIG. 7 is a plan view of the forming station showing a top view of the upper platen.
Figure 8:
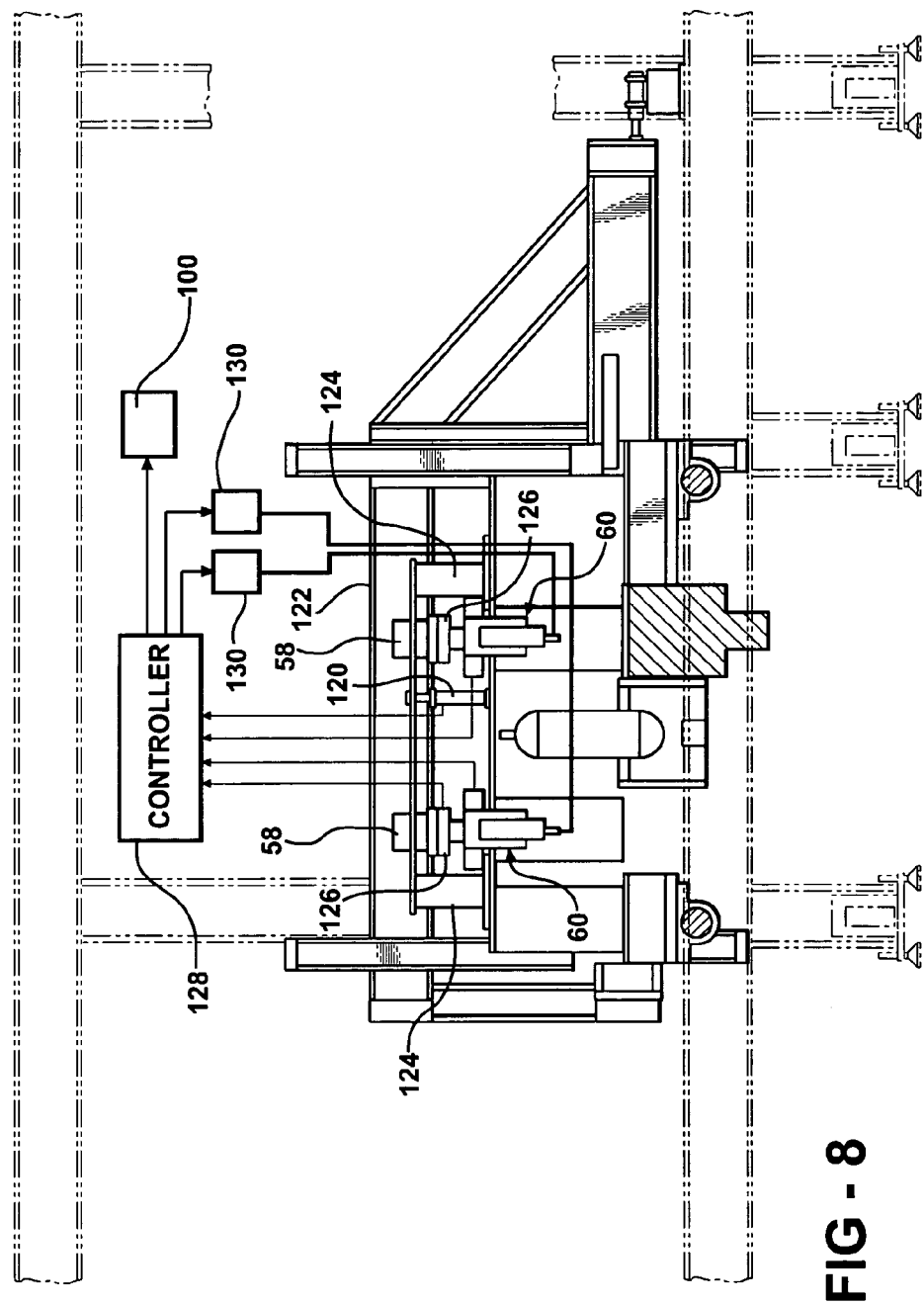
FIG. 8 is a partially sectional view through the lower platen assembly to show certain details of the hydraulic draw system.

The upper platen 10 is driven by an electric servo motor 40 mounted on the top of the upper platen 10 which drives cross shafts 42 (FIG. 7) via transmissions 46 and various couplings shown. Four pinion gears 48 are respectively driven by the cross shafts 42 and engage vertical gear rack posts 50 so that a vertical motion of the platen 10 results when the motor 40 is operated.

The posts 50 are supported by an upper platen framework 37.

A disc brake mechanism 52 is associated with each shaft 42 to allow the upper platen 10 to be held in any position along the path of its vertical travel.

In accordance with the arrangement of U.S. Pat. No. 5,814,185 referenced above, four vertical coupling elements, here comprising shafts 54, are carried by the upper platen assembly 36, each having a key feature 56 on their lower ends. The shafts 54 are aligned with four coupling receptacles 58 each affixed to an output rod of a respective short stroke large diameter hydraulic cylinder 60 mounted to the lower platen 16, the output rods comprising the other matable coupling elements.

When the lower platens 16 move towards the upper platen 16 with the molds aligned, the key ends 56 enter the receptacles 58 to be mated therewith. When coupling is to be carried out, the shafts 54 are rotated by power cylinders 55 to lock the key ends 56 of the shafts 54 to the receptacles 58.

The vertical position of each of the shafts 54 may be individually manually adjusted for the particular tooling by rotation in a threaded member (not shown). Alternatively, the simultaneous chain driven adjustment mechanisms shown in U.S. Pat. No. 5,814,185 may be employed if tools of significantly varying size are to be used.

Figure 3A:
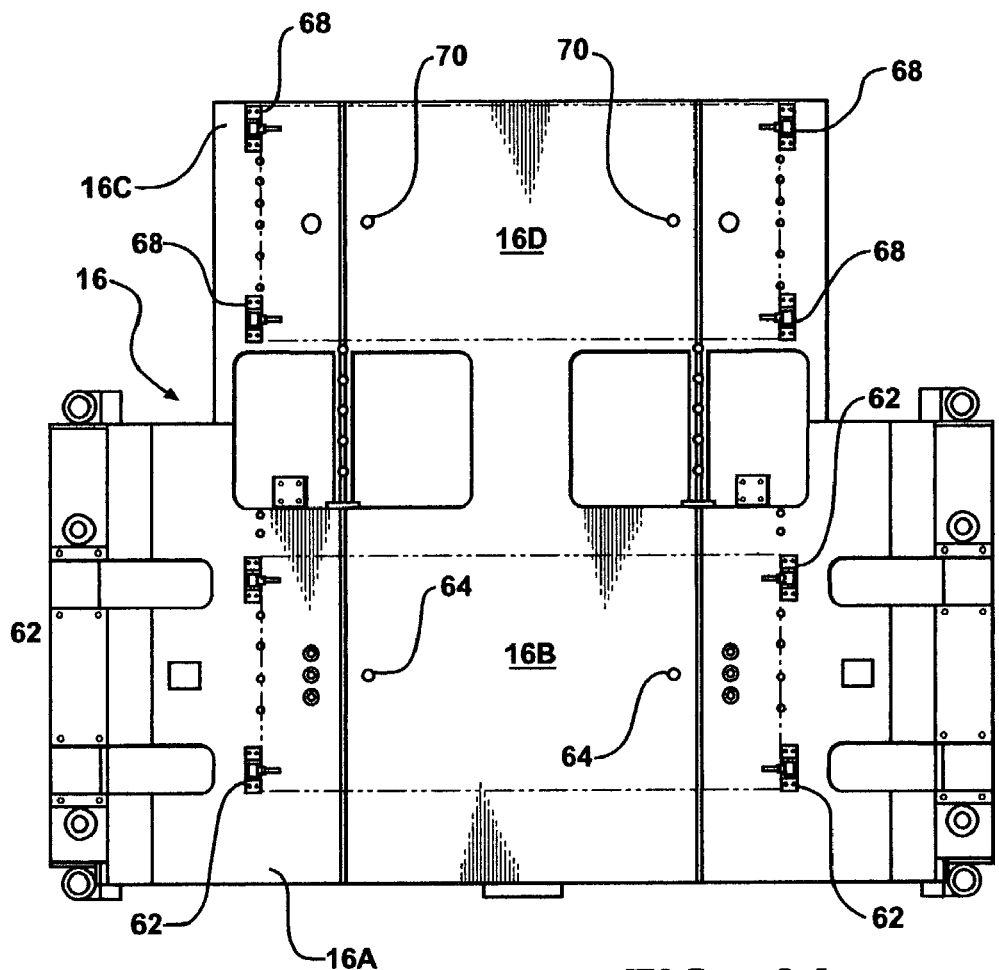
FIGS. 3A and 3B are respective plan views of the lower and upper platen tool receiving surfaces.
Figure 3C:
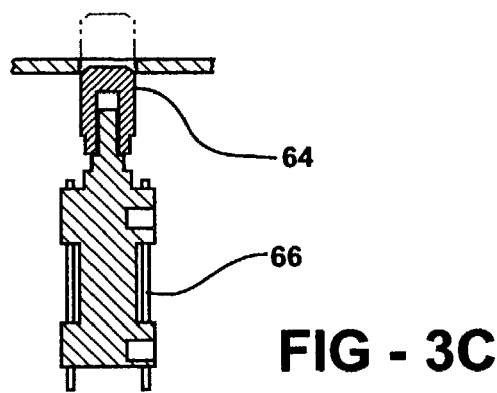
FIG. 3C is a view of the section 1—1 in FIG. 3A.
Figure 3B:
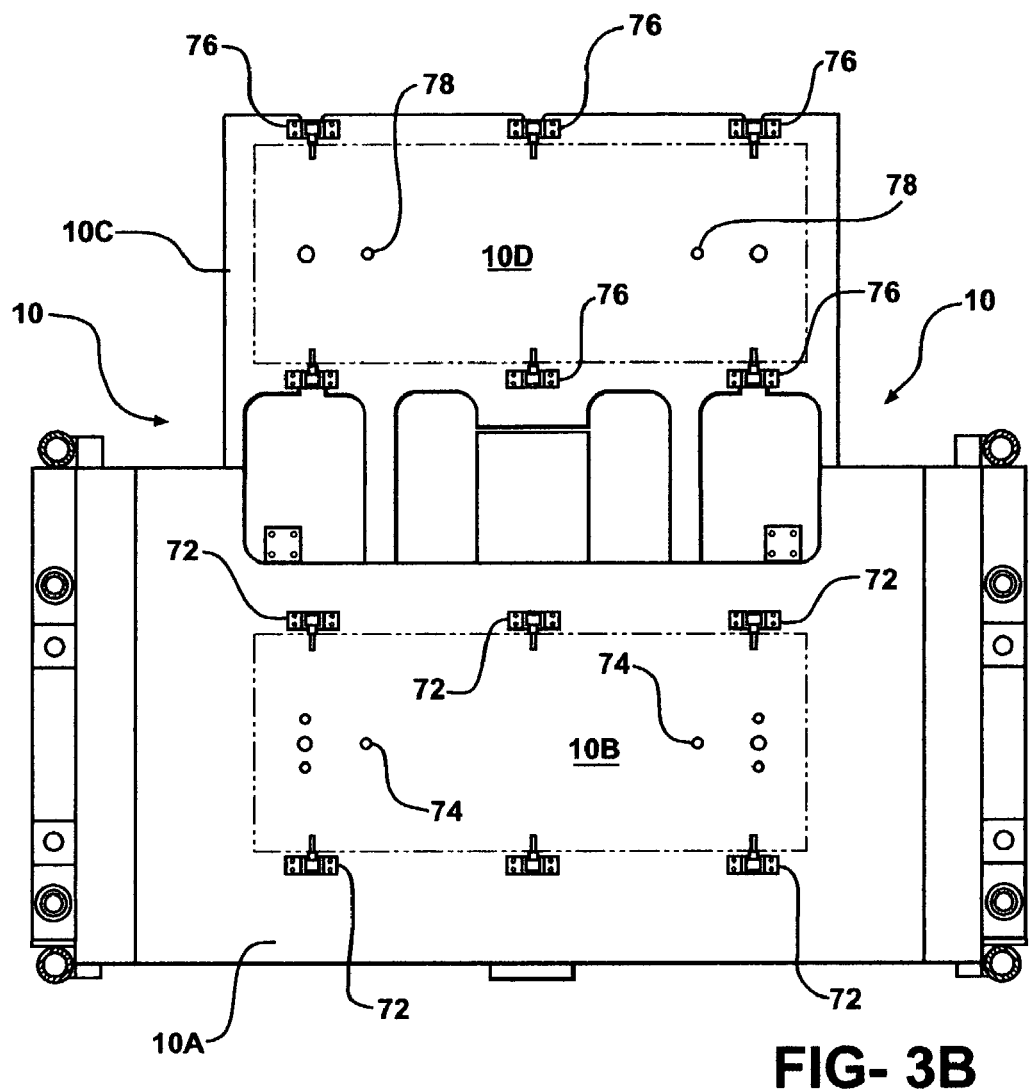

FIGS. 3A and 3B show the tool mounting surfaces of the lower platen 16 and upper platen 10.

A main platen section 16A has a region 16B where the mold 18 is mounted using a series of clamps 62. Locating pins 64 are also used extended with cylinders 66 (FIG. 3C).

An auxiliary lower platen section 16C is attached to the main section 16A and has a region 16D to which the plug assist tool 20 is mounted using clamps 68 and locating pins 70.

Figure 3D:
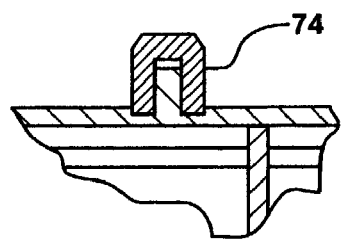
FIG. 3D is a view of the section 2—2 in FIG. 3A.

The upper platen 10 likewise has a main section 10A having a region 100B which receives the mold 12, mounted by an array of clamps 72. Fixed locating pins 74 are also used (FIG. 3D).

An auxiliary section 10C is attached to the main section 10A and has a region 10D receiving the plug assist tool 14.

Clamps 76 and locating pins 78 are used to mount the plug assist tool 14 in these regions.

Figure 5:
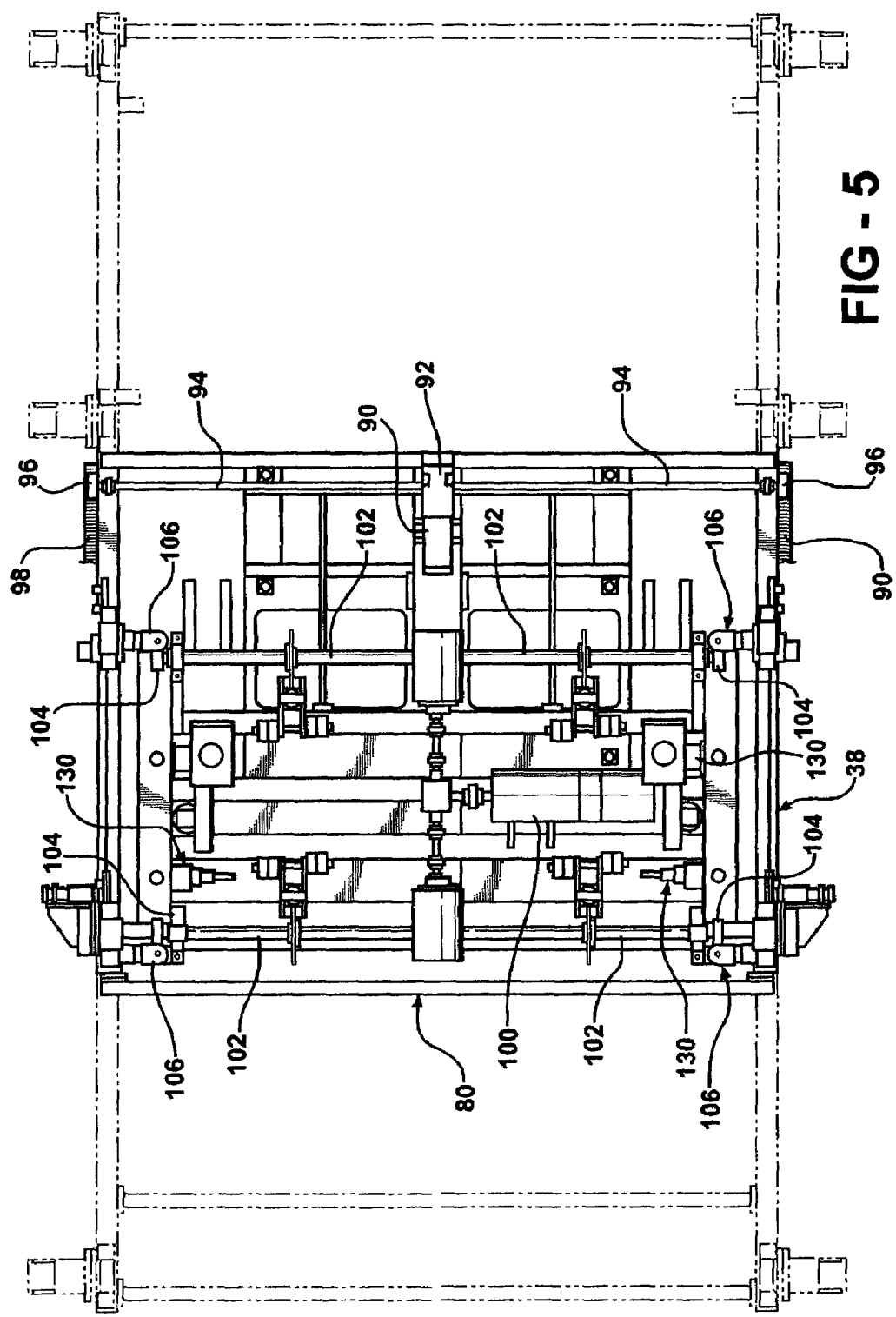
FIG. 5 is a plan view of the lower platen assembly with the machine frame shown in phantom lines.

The lower platen assembly 38 is mounted on a carriage frame 80 supported on the machine frame 34 for movement by a pair of linear bearings 82 each attached to one of a pair of frame members 84. Upper mating bearing/housings 86 are attached to carriage frame members 88. An electric motor 90 and right angle drive 92 drive a pair of shafts 94 each having a pinion gear 96 to one end (FIG. 5). Each gear 96 is in engagement with a respective gear rack 98 supported alongside each frame member 84. The motor 90 thus advances or retracts the carriage frame 80 to either of a first or second position of the lower platen assembly 38 shown in FIGS. 1A and 1C, to enable positioning of the mold 18 either below the plug assist 14 or the upper platen mold 12.

The lower platen assembly 38 is moved vertically by a vertical drive including an electric servo motor 100 driving cross shafts 102 each having a pinion gear 104 fixed at one end. A series of four vertical gear rack posts 106 is engaged by one of each pinion gears 104. The posts 106 are secured by carriage frame members 108, 110.

Figure 4:
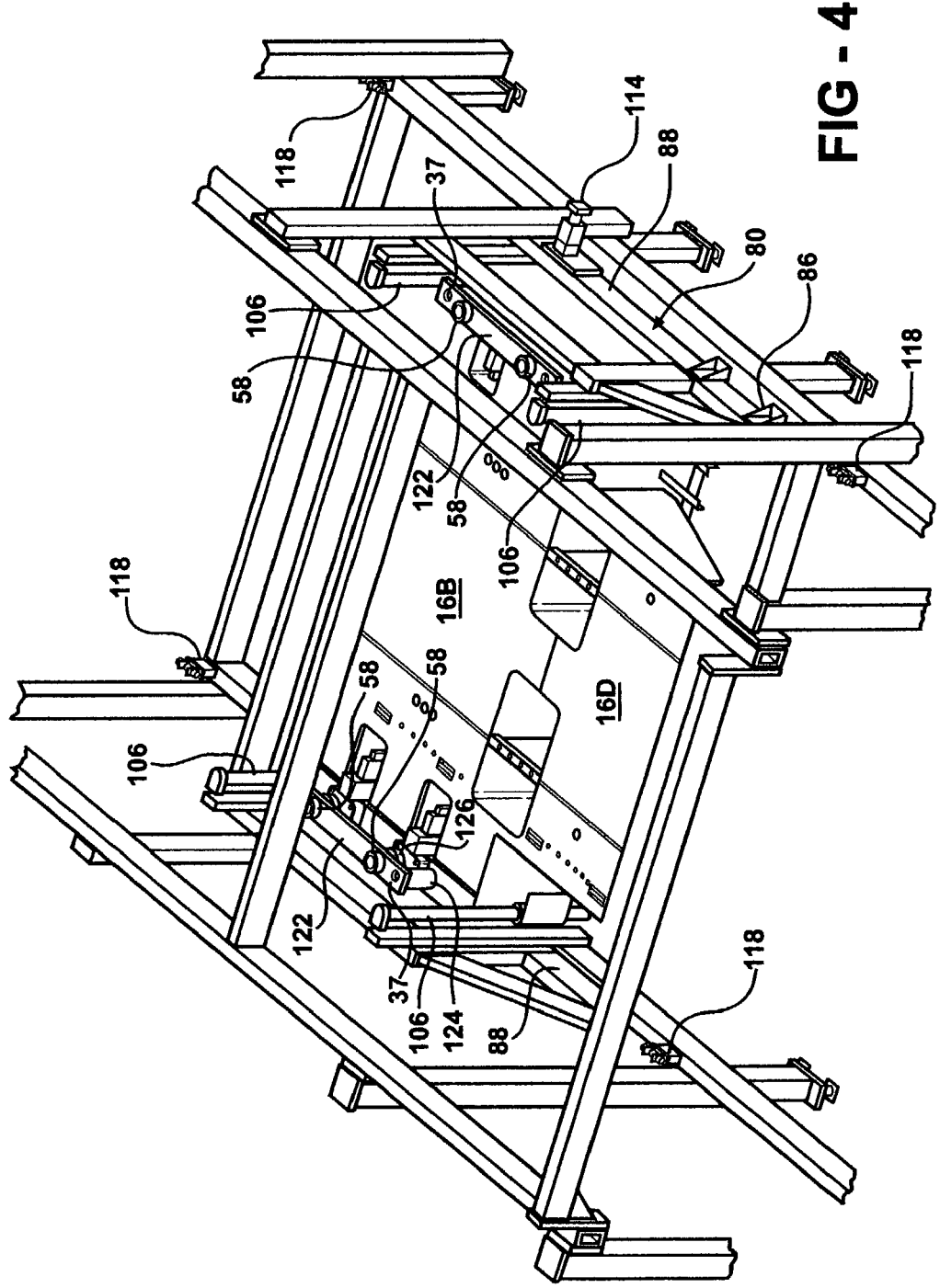
FIG. 4 is a perspective view of the lower platen assembly with the machine frame shown in phantom lines.
Figure 6:
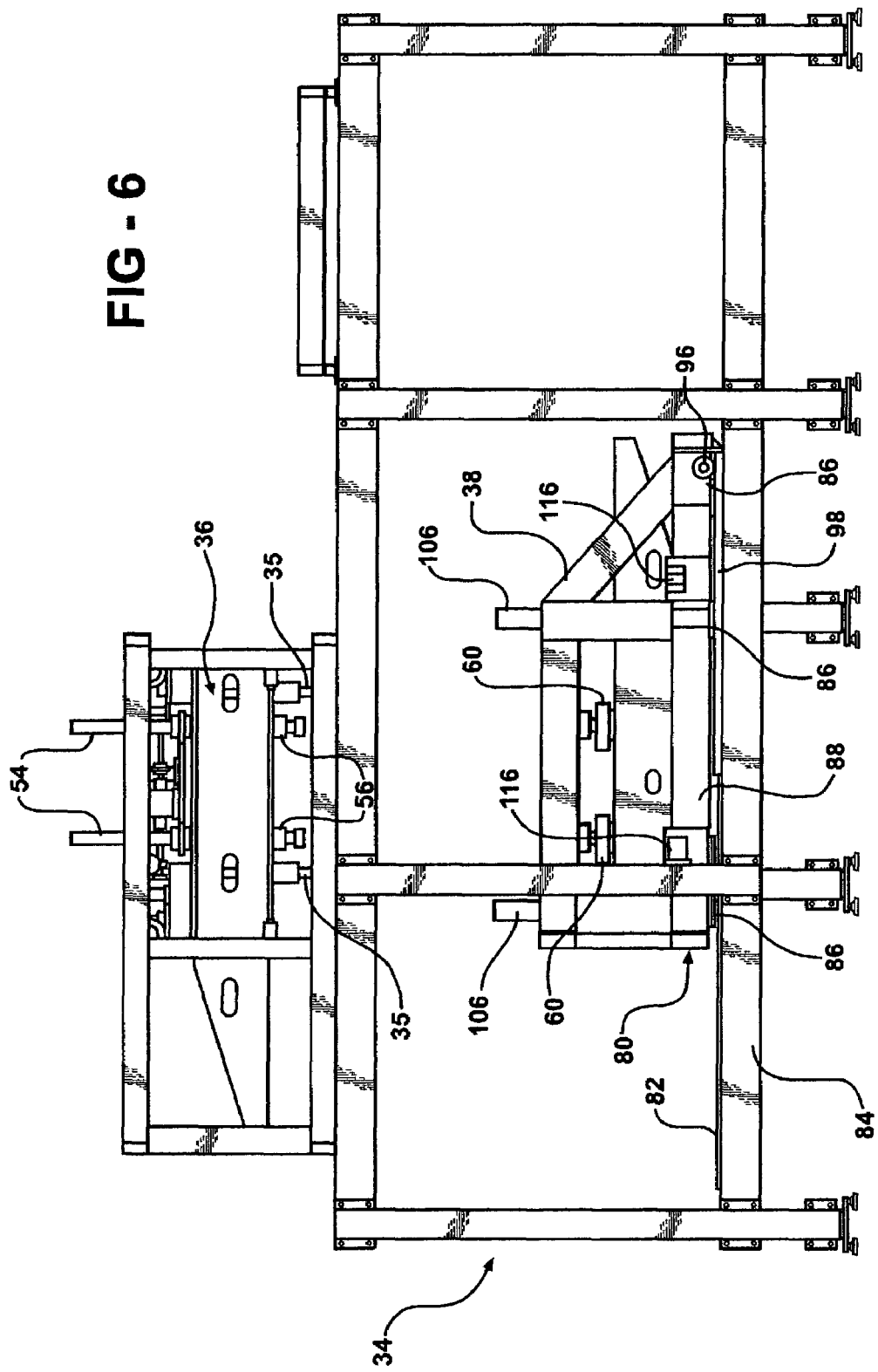
FIG. 6 is a side elevational view of the forming station shown in FIG. 2.

The upper platen assembly 36 also includes four guide posts 35 which are received in guide bores 37 (FIGS. 6 and 4) in standoffs 124 and plate 122 (FIG. 3) to properly align the platens 10, 16 during the sheet fusing step.

The lower platen assembly 38 is accurately located horizontally in each of its first or advanced position and second or retracted position by wedge locator pins 112 driven by power cylinders 114 to engage locator spaces 116 on the outside of each carriage frame member 88. Cushioning shocks 118 are located on the frame 34 so as to engage the carriage frame 80 as it moves into each position.

The basic hydraulic draw mechanism used in U.S. Pat. No. 5,814,185 is here also used but with certain improvements.

A built in individual position signal generator is incorporated into each hydraulic cylinder 60, which transmits signals corresponding to the position of its output rod to a system controller 128 which in turn controls a proportioning valve 130 for each cylinder so as to insure precisely uniform travel of each cylinder rod to accurately achieve uniform compression of the fused flanges on the completed part P. Such cylinders equipped with built in position signal generators are commercially available. Also included is an auxiliary cylinder combined with a linear transducer 120 which generates electrical signals corresponding to the travel of the output rods of hydraulic cylinders 60 by having an output shaft connected to antirotation plate 122 connected to each pair of receptacles 58 and the pair of stand offs 124.

A load cell 126 is attached to each hydraulic cylinder output rod between the receptacle 58 and plate 122. Each load cell 126 generates an electrical signal after the clearances are taken up when the cylinders 60 are activated. Built in clearances are required between the receptacles 58 and end keys 56 in order to allow the rotation necessary to lock these components together axially.

The auxiliary cylinder-transducer 120 creates an output signal corresponding to the extent of travel of the lower platen 16. This signal is transmitted to the industrial controller 128 along with the load cell signals.

The industrial controller 128 causes the vertical drive motor 60 of the lower platen to be driven up to follow the motion caused by hydraulic cylinders 60, as described in the '185 patent.

However, this action is delayed until the load cell signals indicate that the clearances have been eliminated and compression of the formed sheet flanges has begun.

This is necessary to insure that the motor 100 does not itself attempt to drive the lower platen 16 to compress the sheet flanges, but rather all compression is done by the much larger force cylinders 60, and thus the drive motor 100 acts only to counteract the weight of the lower platen 16 and relieve the brake 52 of the upper platen 10 of this weight.

What is claimed is:

1. A twin sheet thermoforming forming station including:
    a thermoforming press with a stationary frame;
    an upper platen mounted on said stationary frame to be movable vertically carrying a female mold and a male plug assist;
    a lower platen below said upper platen mounted on said frame to be vertically movable and carrying side by side a female mold and a male plug assist;
    one of said upper or lower platens mounted also on said stationary press frame to be movable laterally between a first position whereat said female molds are each aligned with a plug assist and a second position whereat said female molds are aligned with each other;
    a horizontal drive for driving said laterally movable platen between said first and second positions;
    an upper platen vertical drive for moving said upper platen vertically;
    a lower platen vertical drive for moving said lower platen vertically;
    said upper and lower platens movable together by operation of said respective vertical drives to move each of said plug assists towards a respective mold with said laterally movable platen in said first position; said molds thereby aligned together to enable fusing of formed sheets together with said movable platen in said second position, and
    a hydraulic draw mechanism comprising sets of mating elements on said upper and lower platen respectively mated together as said upper and lower platen move together with said lower platen in said second position and said molds aligned, a coupling mechanism locking mating pairs of said elements together, a hydraulic cylinder acting on each coupled mating pair of elements to draw said upper and lower platens together to fuse a perimeter flange on sheets previously formed in said molds.

2. The forming station according to claim 1 wherein said laterally movable platen comprises said lower platen.

3. The forming station according to claim 2 wherein said lower platen vertical drive includes a series of four gear rack posts arranged about a perimeter of said upper platen and a drive motor driving a pinion gear for each gear rack post to cause said lower platen to ascend or descend said gear rack posts.

4. The forming station according to claim 1 wherein each hydraulic cylinder has a position signal generator and valve for limiting flow of hydraulic fluid thereto associated therewith, said position signal generator producing signals corresponding to the position of an output member, and a controller receiving said position signals and controlling said valve associated with each hydraulic cylinder to limit the flow of hydraulic fluid to each cylinder in correspondence to said position signals so as to produce precisely equal movement of all of said hydraulic cylinder output members and thereby carry out a uniform compression of said part perimeter flange.

5. The forming station according to claim 4 further including a brake holding said upper platen stationary during operation of said hydraulic cylinders so that only said lower platen moves when said upper and lower platen are drawn together by said hydraulic cylinders.

6. The forming station according to claim 5 further including a linear transducer generating signals corresponding to said upward travel of said lower platen and said controller causes said vertical drive motor to drive said lower platen upward to follow upward platen movement produced by said hydraulic cylinders.

7. The forming station according to claim 6 further including a load cell on each hydraulic cylinder output member to detect the beginning of compression of said part, and a linear transducer to produce signals corresponding to the extent of movement of said output members, and said controller causing said vertical drive to drive said lower platen to the position of said lower platen produced by said hydraulic cylinders whereby the weight of said lower platen is offset by the driving of said vertical drive motor.

8. The forming station according to claim 2 wherein said lower platen is supported for said lateral movement by linear bearings on said frame.

9. The forming station according to claim 6 wherein said upper platen is supported on said frame so as to not be movable laterally.

10. The forming station according to claim 1 further including an insert placement device positioned to place an insert within a formed sheet in said mold carried by said lower platen prior to fusing said formed sheets together.

11. The forming station according to claim 1 further including a port art removal device removing said part from said lower mold after said fusing of said formed sheets.

* * * * *

(12) EX PARTE REEXAMINATION CERTIFICATE (7645th)
United States Patent
Kundinger et al.

(10) Number: US 6,969,246 C1
(45) Certificate Issued: Jul. 27, 2010

(54) FORMING STATION AND PROCESS FOR TWIN SHEET THERMOFORMING

(75) Inventors: James Kundinger, Auburn, MI (US); Stephen Keeley, Claire, MI (US)

(73) Assignee: Brown Machine LLC., Beaverton, MI (US)

Reexamination Request:
No. 90/010,152, Apr. 29, 2008

Reexamination Certificate for:
Patent No.: 6,969,246
Issued: Nov. 29, 2005
Appl. No.: 10/218,982
Filed: Aug. 14, 2002

Related U.S. Application Data

(60) Provisional application No. 60/398,266, filed on Jul. 24, 2002.

(51) Int. Cl.
*B29C 69/02* (2006.01)

(52) U.S. Cl. .................. 425/515; 425/503; 425/519; 425/521; 264/545

(58) Field of Classification Search .................. None
See application file for complete search history.

(56) References Cited

U.S. PATENT DOCUMENTS

| 3,854,860 | A  | 12/1974 | Haag |
| 5,759,591 | A  | 6/1998  | Rhoades et al. |
| 5,814,185 | A  | 9/1998  | Chun et al. |
| 6,372,176 | B1 | 4/2002  | Ekendahl et al. |
| 6,969,246 | B1 | 11/2005 | Kundinger et al. |

*Primary Examiner*—Bruce Campell

(57) ABSTRACT

A forming station for a thermoformer in which the lower platen is lowered and moved laterally on linear bearings on the machine frame after two sheets are formed in side by side mold-plug assist tool sets so as to align the respective molds and formed sheets. The formed sheets are squeezed together with flanges on the formed sheets thereby fused together by a draw mechanism including a series of hydraulic cylinders which are connected to coupled elements carried by the upper and lower platens so as create the squeezing movement when the cylinders are pressurized. A precision control is exercised over the operation of each of the cylinders using a position sensing device associated with each cylinder to insure equal movement of the output member of each cylinder. The lower platen vertical drive is activated in correspondence with the travel produced by the hydraulic cylinders to reduce the load on a brake holding the upper platen stationary.

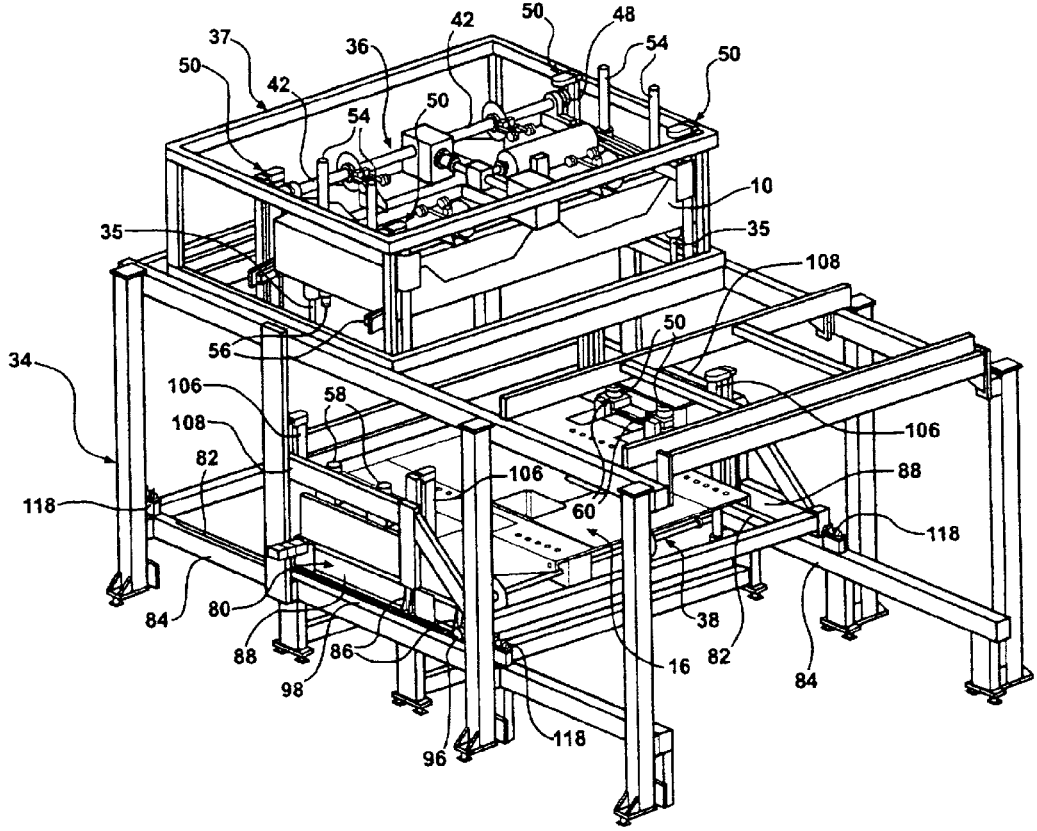

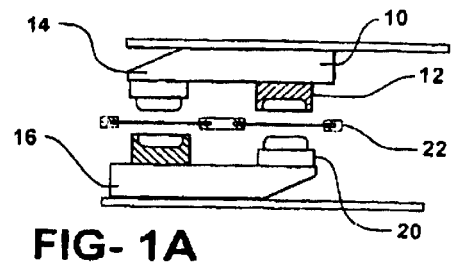
FIG- 1A
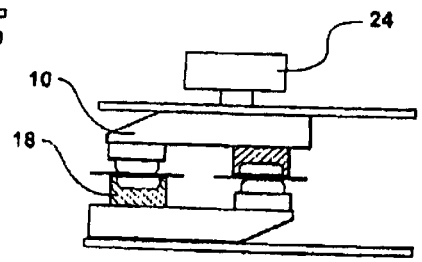
FIG- 1B - AMENDED
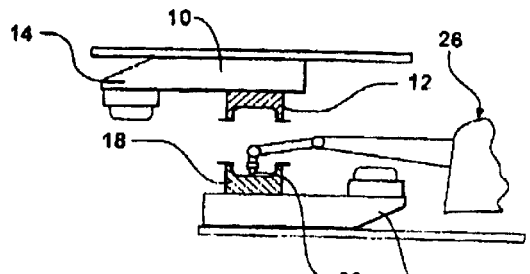
FIG- 1C -AMENDED
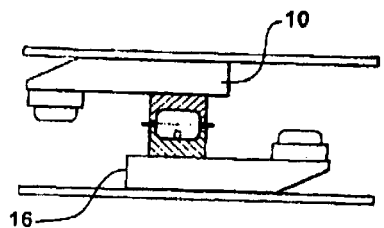
FIG- 1D- AMENDED
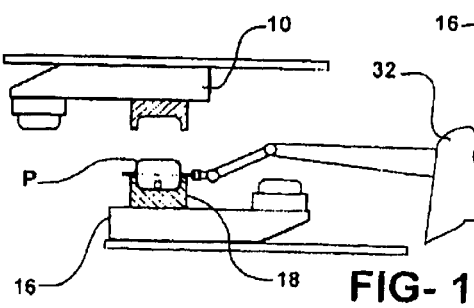
FIG- 1E -AMENDED

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 63–67:
In FIG. 1A, the upper and lower platen vertical drives [24, 26] *(described herein)* cause the platens 10, 16 to be advanced to form the respective sheets with the tools by a conventional thermoforming process, using vacuum, and/or fluid pressure, etc. in the well known manner.

Column 4, lines 5–11:
As indicted by FIG. 1C, the lower platen 16 is horizontally shiftable, and a horizontal drive [24] *(described herein)* is activated to shift the lower platen 16 horizontally to a position whereat lower mold 18 is aligned beneath upper mold 12, each retaining their respective formed B and A sheets. A robot 26 or other loader device can emplace an insert 28 within the formed bottom of B sheet.

Column 4, lines 12–28:
The upper and lower platens 10, 16 are drawn together by a hydraulic draw mechanism [30 as indicated in FIG. 1D] *(described herein)* to fuse the abutting flanges on the formed A and B sheets together. This mechanism [30] is generally similar to that described in U.S. Pat. No. 5,814,185 here incorporated by reference, with certain improvements described below. The upper platen 10 is held in position by brakes as described below and in the '185 patent, the lower platen 16 and upper platen 10 are coupled together by mechanical elements connected to hydraulic cylinders. The cylinders when pressurized draw the lower platen 16 up towards the stationary upper platen 10 as described below. A transducer senses this movement, and the servo motor drive is controlled so as to vertically move the lower platen 16 so as to follow this squeezing movement to support the weight of the lower platen 16, to avoid overloading the brake holding the upper platen 10, as described below in further detail.

Column 4, lines 63–67:
When the lower platens 16 move towards the upper platen [16] *10* with the molds aligned, the key ends 56 enter the receptacles 58 to be mated therewith. When coupling is to be carried out, the shafts 54 are rotated by power cylinders 55 to lock the key ends 56 of the shafts 54 to the receptacles 58. The vertical position of each of the shafts 54 may be individually manually adjusted for the particular tooling by rotation in a threaded member (not shown). Alternatively, the simultaneous chain driven adjustment mechanisms shown in U.S. Pat. No. 5,814,185 may be employed if tools of significantly varying size are to be used.

THE DRAWING FIGURES HAVE BEEN CHANGED AS FOLLOWS:

Fig. No(s). 1B, 1C, 1D and 1E
Reference numbers have been added and/or corrected. Some parts of the apparatus have been removed, along with their reference numerals.

AS A RESULT OF REEXAMINATION, IT HAS BEEN DETERMINED THAT:

Claim 1 is cancelled.

New claim 12 is added and determined to be patentable.

Claims 2–11 were not reexamined.

*12. A twin sheet thermoforming forming station including:*
*a thermoforming press with a stationary machine frame;*
*an upper platen carrying side by side a female mold and a male plug assist;*
*a lower platen below said upper platen carrying side by side a female mold and a male plug assist;*
*a carriage frame mounted on said machine frame for linear lateral movement, and a drive linearly and horizontally moving said carriage frame between a first and second position;*
*one of said upper or lower platens mounted to said carriage to be movable laterally therewith between said first position whereat said female molds are each aligned with a plug assist and said second position whereat said female molds are aligned with each other;*
*a platen vertical drive for moving said one platen vertically, said vertical drive mounted on said carriage frame to be carried therewith;*
*a platen vertical drive on said machine frame for moving said other platen vertically;*
*said upper and lower platens movable towards each other by operation of said respective vertical drives to move each of said plug assists towards a respective mold when said laterally movable one platen is in said first position, and to cause fusing of said formed sheets together when said movable platen is in said second position with said molds aligned together;*
*and a hydraulic draw mechanism comprising sets of mating elements on said upper and lower platen respectively mated together as said upper and lower platen move together with said one platen in said second position and said molds aligned, and further comprising a coupling mechanism locking mating pairs of said elements together, and a hydraulic cylinder acting on each coupled mating pair of elements to draw said upper and lower platens together to fuse a perimeter flange on sheets previously formed in said molds.*

* * * * *